US012667778B2

(12) United States Patent
Zhou et al.

(10) Patent No.: US 12,667,778 B2
(45) Date of Patent: Jun. 30, 2026

(54) MULTIPLAYER MULTIMEDIA GAME

(71) Applicant: Beijing Zitiao Network Technology Co., Ltd., Beijing (CN)

(72) Inventors: Yuecheng Zhou, Beijing (CN); Guanyuan Peng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 245 days.

(21) Appl. No.: 18/517,877

(22) Filed: Nov. 22, 2023

(65) Prior Publication Data

US 2024/0207735 A1     Jun. 27, 2024

(30) Foreign Application Priority Data

Dec. 22, 2022     (CN) .......................... 202211667143.9

(51) Int. Cl.
*A63F 13/424*      (2014.01)
*G06F 3/16*      (2006.01)

(52) U.S. Cl.
CPC ............ *A63F 13/424* (2014.09); *G06F 3/167* (2013.01)

(58) Field of Classification Search
CPC .................. A63F 13/215; A63F 13/424; A63F 2009/2433; G06F 3/167; G10L 15/00
See application file for complete search history.

(56) References Cited

U.S. PATENT DOCUMENTS

| | | | |
|---|---|---|---|
| 9,511,287 B2 * | 12/2016 | Lockton | A63F 13/335 |
| 9,656,158 B1 * | 5/2017 | Walby | A63F 13/35 |
| 11,471,777 B1 | 10/2022 | Roberts et al. | |
| 2004/0014524 A1 * | 1/2004 | Pearlman | A63F 13/46 |
| | | | 463/30 |

(Continued)

FOREIGN PATENT DOCUMENTS

| | | |
|---|---|---|
| CN | 108334540 A | 7/2018 |
| CN | 108958803 A | 12/2018 |

(Continued)

OTHER PUBLICATIONS

China National Intellectual Property Administration, First Office Action for Chinese Application No. 202211667143.9, mailed Oct. 14, 2024, 16 Pages.

(Continued)

*Primary Examiner* — Lawrence S Galka
(74) *Attorney, Agent, or Firm* — Alleman Hall LLP

(57) ABSTRACT

Embodiments of the present disclosure provide an interactive information display method and apparatus, an electronic device and a storage medium. The method includes: displaying a first interactive interface corresponding to a target game room; obtaining target media, and playing the target media in the first interactive interface; in response to the target media being played to a target playing position, pausing the playing of the target media, and displaying first interaction information; and displaying second interaction information in the first interactive interface. During the process of playing the target media in the target game room, automatic pause is performed at the target playing position to display the first interaction information, so as to guide the speaking, and then the first response voice is evaluated. Therefore, automatic guidance and propulsion of the game flow are realized.

16 Claims, 9 Drawing Sheets

(56)  References Cited

U.S. PATENT DOCUMENTS

| | | | |
|---|---|---|---|
| 2006/0121965 A1* | 6/2006 | MacIver | A63F 13/40 |
| | | | 463/9 |
| 2006/0294557 A1 | 12/2006 | Morris et al. | |
| 2015/0254242 A1 | 9/2015 | Cirrincione et al. | |
| 2015/0290531 A1* | 10/2015 | Herz | A63F 3/00088 |
| | | | 434/237 |

FOREIGN PATENT DOCUMENTS

| | | | |
|---|---|---|---|
| CN | 109771956 A | 5/2019 | |
| CN | 109922377 A | 6/2019 | |
| CN | 110430475 A | 11/2019 | |
| CN | 114073854 A | 2/2022 | |
| CN | 115079876 A | 9/2022 | |
| CN | 115845367 A | 3/2023 | |

OTHER PUBLICATIONS

How to play Yinyue? Nov. 22, 2018, 10 pages, Retrieved from the internet URL: https://jingyan.baidu.com/article/11c17a2cced7dbf447e39d41.html.

* cited by examiner

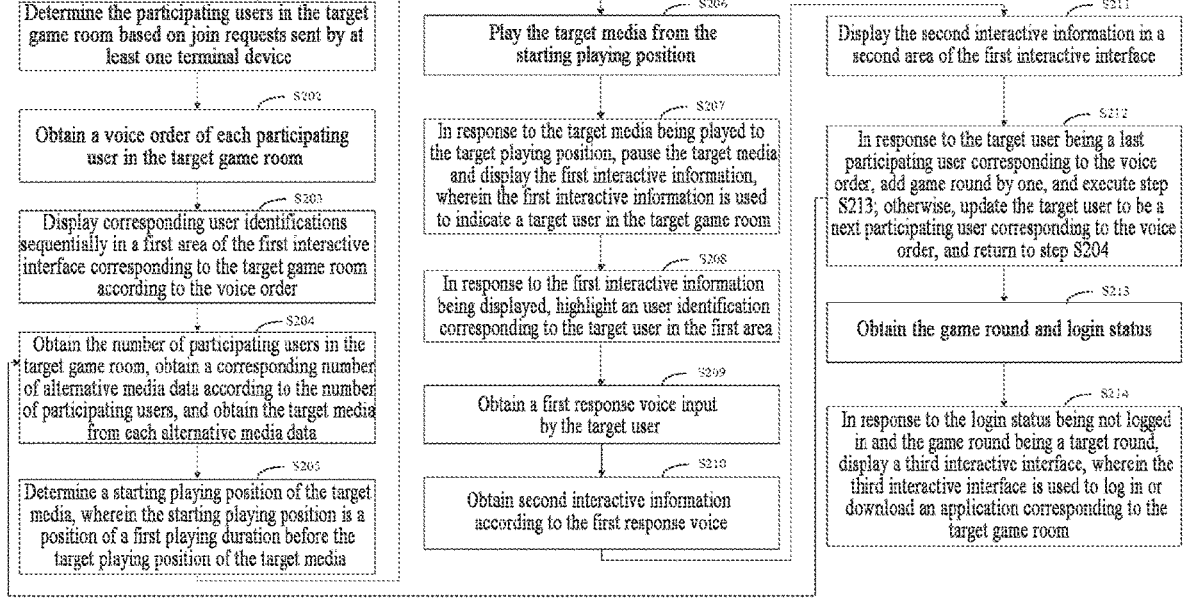

Determine the participating users in the target game room based on join requests sent by at least one terminal device — S201

Obtain a voice order of each participating user in the target game room — S202

Display corresponding user identifications sequentially in a first area of the first interactive interface corresponding to the target game room according to the voice order — S203

Obtain the number of participating users in the target game room, obtain a corresponding number of alternative media data according to the number of participating users, and obtain the target media from each alternative media data — S204

Determine a starting playing position of the target media, wherein the starting playing position is a position of a first playing duration before the target playing position of the target media — S205

Play the target media from the starting playing position — S206

In response to the target media being played to the target playing position, pause the target media and display the first interactive information, wherein the first interactive information is used to indicate a target user in the target game room — S207

In response to the first interactive information being displayed, highlight an user identification corresponding to the target user in the first area — S208

Obtain a first response voice input by the target user — S209

Obtain second interactive information according to the first response voice — S210

Display the second interactive information in a second area of the first interactive interface — S211

In response to the target user being a last participating user corresponding to the voice order, add game round by one, and execute step S213; otherwise, update the target user to be a next participating user corresponding to the voice order, and return to step S204 — S212

Obtain the game round and login status — S213

In response to the login status being not logged in and the game round being a target round, display a third interactive interface, wherein the third interactive interface is used to log in or download an application corresponding to the target game room — S214

Fig.7

MULTIPLAYER MULTIMEDIA GAME

CROSS REFERENCE TO RELATED APPLICATION(S)

The present application claims priority to the Chinese patent application filed with the China National Intellectual Property Administration on Dec. 22, 2022, with application No. 202211667143.9 entitled "Interactive Information Display Method, Apparatus, Electronic Device and Storage Medium", the entire disclosure of which is hereby incorporated by reference in its entirety.

FIELD

Embodiments of the present disclosure relate to the technical field of the Internet, and in particular, to an interactive information display method and apparatus, an electronic device and a storage medium.

BACKGROUND

At present, in voice imitation games such as song solitaire, dialogue solitaire, and the like, it is necessary for participating users to perform voice imitation according to the playing of media such as videos and music, so as to realize game interaction among a plurality of users. However, there is no corresponding application program in the prior art to provide a dedicated game flow support for the participating users of such games.

Therefore, in the prior art, the users may usually only operate other media play software to manually control and propel the game flow, resulting in the problems of low efficiency, tedious operation and the like of the game flow, and thus affecting the fluency of the games.

SUMMARY OF THE INVENTION

Embodiments of the present disclosure provide an interactive information display method and apparatus, an electronic device and a storage medium, so as to overcome the problems of low efficiency, complex operation and the like of a game flow.

In a first aspect, an embodiment of the present disclosure provides an interactive information display method, including:

displaying a first interactive interface corresponding to a target game room; obtaining target media, and playing the target media in the first interactive interface; in response to the target media being played to a target playing position, pausing the playing of the target media, and displaying first interaction information, the first interaction information is used for indicating a target user in the target game room; and displaying second interaction information in the first interactive interface, the second interaction information representing a consistency between voice content of a first response voice input by the target user and target information, and the target information representing media content of the target media after the target playing position.

In a second aspect, an embodiment of the present disclosure provides an interactive information display apparatus, including:

a display module, configured to display a first interactive interface corresponding to a target game room;

a first interaction module, configured to obtain target media, and play the target media in the first interactive interface;

a second interaction module, configured to: in response to the target media being played to a target playing position, pause the playing of the target media, and display first interaction information, the first interaction information being used for indicating a target user in the target game room; and a third interaction module, configured to display second interaction information in the first interactive interface, the second interaction information representing a consistency between voice content of a first response voice input by the target user and target information, the target information representing media content of the target media after the target playing position.

In a third aspect, an embodiment of the present disclosure provides an electronic device, including:

a processor, and a memory in communication connection with the processor;

the memory stores a computer execution instruction; and the processor executes the computer execution instructions stored in the memory to implement the interactive information display method in the first aspect and various possible designs of the first aspect.

In a fourth aspect, an embodiment of the present disclosure provides a computer-readable storage medium storing computer execution instructions, the computer execution instruction, when executed by a processor, implementing the interactive information display method in the first aspect and various possible designs of the first aspect.

In a fifth aspect, an embodiment of the present disclosure provides a computer program product comprising a computer program, the computer program, when executed by a processor, implementing the interactive information display method in the first aspect and various possible designs of the first aspect.

According to the interactive information display method and apparatus, the electronic device and the storage medium provided in the present embodiment, the method includes: displaying the first interactive interface corresponding to the target game room; obtaining the target media, and playing the target media in the first interactive interface; when the target media is played to the target playing position, pausing the playing of the target media, and displaying the first interaction information, wherein the first interaction information is used for indicating the target user in the target game room; and displaying the second interaction information in the first interactive interface, wherein the second interaction information represents the consistency between the voice content of the first response voice input by the target user and the target information, and the target information represents the media content of the target media after the target playing position. During the process of playing the target media in the target game room, automatic pause is performed at the target playing position to display the first interaction information, so as to guide the speaking, and then the second interaction information is generated and displayed on the basis of the consistency between the first response voice of the target user and the target information in the target media, so as to evaluate the first response voice. Therefore, automatic guidance and propulsion of the game flow are realized, the efficiency of performing the game flow is improved, and the game fluency is improved.

BRIEF DESCRIPTION OF THE DRAWINGS

To illustrate technical solutions in the embodiments of the present disclosure or in the prior art more clearly, a brief introduction on the drawings which are needed in the description of the embodiments or the prior art is given below. Apparently, the drawings in the description below are merely some of the embodiments of the present disclosure, based on which other drawings may be obtained by those ordinary skilled in the art without any creative effort.

FIG. 7 is a second schematic flowchart of an interactive information display method provided in an embodiment of the present disclosure;

DETAILED DESCRIPTION OF EMBODIMENTS

In order to make the objectives, technical solutions and advantages of the embodiments of the present disclosure clearer, a clear and complete description of the technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those ordinary skilled in the art based on the embodiments in the present disclosure without any creative effort, fall into the protection scope of the present disclosure.

It should be noted that, user information (including, but not limited to, user equipment information, user personal information, and the like) and data (including, but not limited to, data for analysis, stored data, displayed data, and the like) involved in the present application are all information and data, which are authorized by a user or fully authorized by various parties, the collection, use and processing of related data need to comply with relevant laws and regulations and standards of relevant countries and regions, and a corresponding operation entry is provided for the user to select authorization or rejection.

Figure 1:
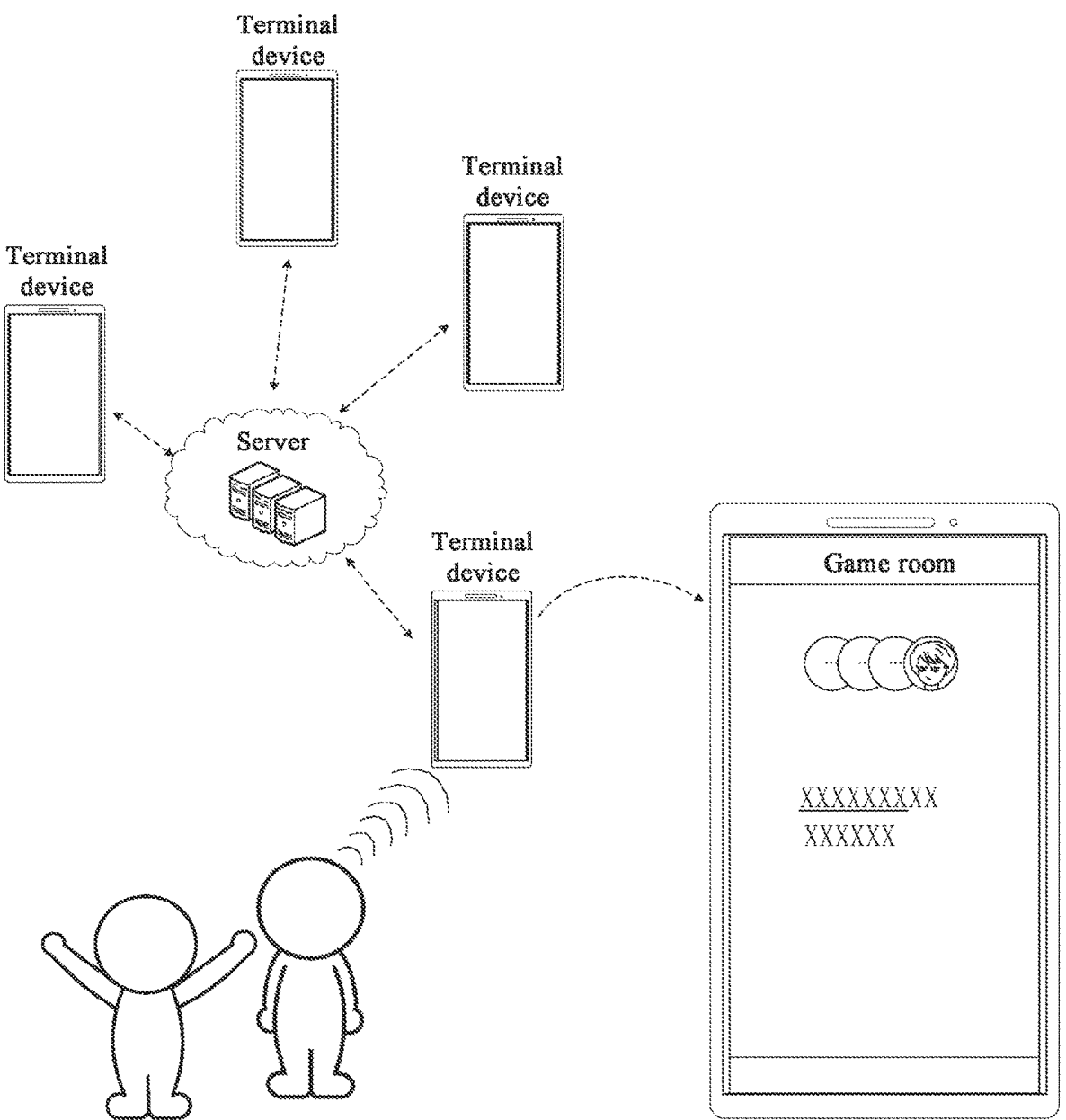
FIG. 1 is an application scenario diagram of an interactive information display method provided in an embodiment of the present disclosure.

The application scenarios of the embodiments of the present disclosure are explained below:

FIG. 1 is an application scenario diagram of an interactive information display method provided in an embodiment of the present disclosure. The interactive information display method provided in the embodiment of the present disclosure may be applied to an application scenario of voice imitation games. As shown in FIG. 1, the method provided in the embodiment of the present disclosure may be applied to a terminal device, and the terminal device may implement a voice imitation game in an online mode, an offline mode, or an online and offline mixed mode by means of running a target application program. Specifically, for example, taking the online mode as an example, a game room is created by means of the target application program running in the terminal device, then a plurality of terminal devices joining the game room communicate with each other via a server, and synchronously play media data such as a song, a video and the like, for example, a video containing lyrics (shown as X in the figure) shown in the figure, and a participating user inputs voice, such as singing, recitation and the like under the guidance of the media data. Therefore, the game flow of a voice imitation game such as song solitaire, dialogue solitaire and the like is implemented.

For the application scenario of the voice imitation games, there is no corresponding application program in the prior art to provide a dedicated game flow support for the participating user of such games, the user may usually only operate other media play software to manually control and propel the game flow, for example, manually play a specified song by starting a music application program, and then manually pause the song at a required playing position, and then the participating user performs follow singing imitation. This results in the problems of low efficiency, tedious operation and the like of the game flow, and thus affecting the fluency of the game.

The embodiments of the present disclosure provide an interactive information display method to solve the above-mentioned problems.

Figure 2:
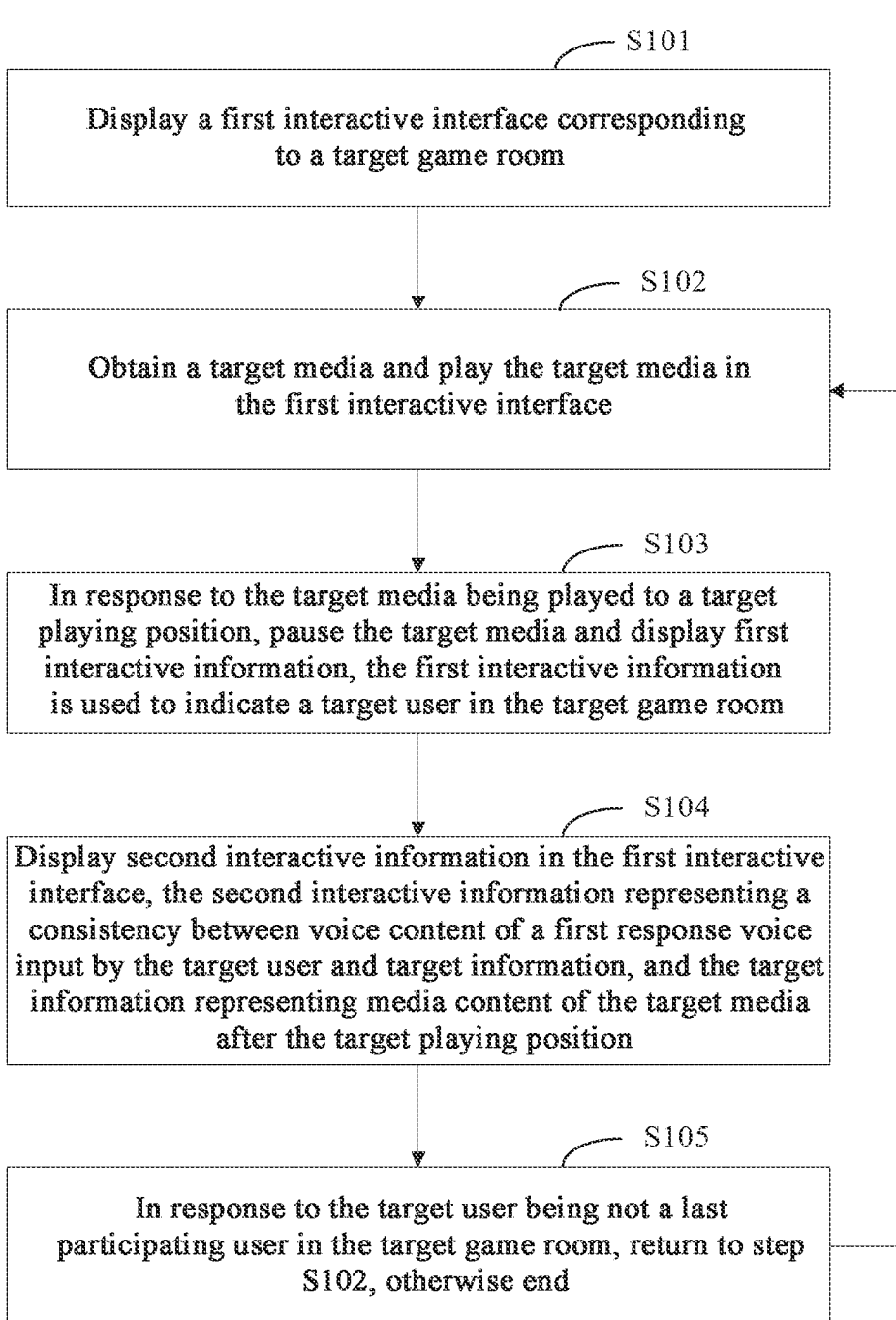
FIG. 2 is a first schematic flowchart of an interactive information display method provided in an embodiment of the present disclosure.

Referring to FIG. 2, FIG. 2 is a first schematic flowchart of an interactive information display method provided in an embodiment of the present disclosure. The method in the present embodiment may be applied to a terminal device or a server, and the interactive information display method includes:

Step S101: displaying a first interactive interface corresponding to a target game room.

Exemplarily, the interactive information display method provided in the present embodiment may be executed by running a target application program in the terminal device, specifically, after the target application program is run, a corresponding control and button may be triggered to enter the target game room, and a room interface of the target game room, that is, the first interactive interface, is displayed. Common identifiers such as a room identifier and a homeowner identifier may be displayed in the first interactive interface, and the specific implementation style of the first interactive interface may be set as needed, which is not specifically described herein.

Step S102: obtaining target media, and playing the target media in the first interactive interface.

Further, after entering and displaying the first interactive interface, the terminal device obtains the target media, and plays the target media in the first interactive interface, wherein the target media is media data having a playing duration, for example, including audios, videos, and the like. More specifically, according to the specific content of the media data, the target media is, for example, a piece of music, a movie segment, several sentences of lyrics played in a scrolling manner, and the like. The target media may be randomly obtained from a preset media library, and may also be manually selected from the media library by a user who operates the terminal device by means of a manual operation.

Figure 3:
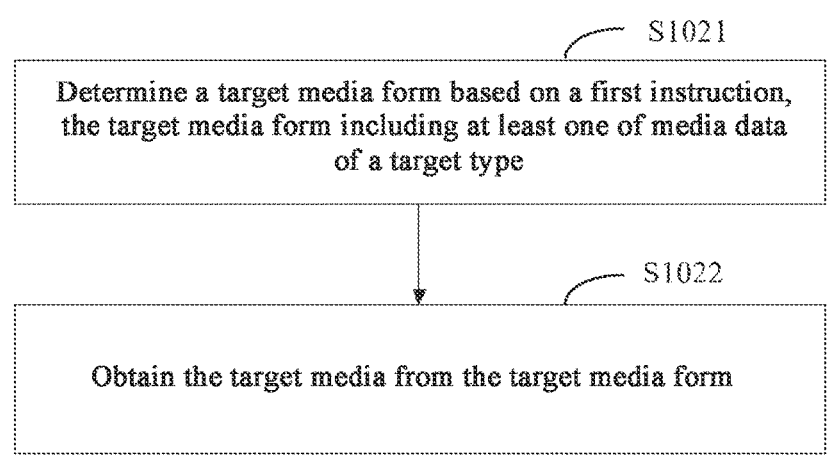
FIG. 3 is a flowchart of a specific implementation of step S102 in the embodiment shown in FIG. 2.

In a possible implementation, as shown in FIG. 3, the specific implementation of the step S102 includes:

Step S1021: determining a target media form based on a first instruction, the target media form comprising at least one piece of media data of a target type.

Step S1022: obtaining the target media from the target media form.

Figure 4:
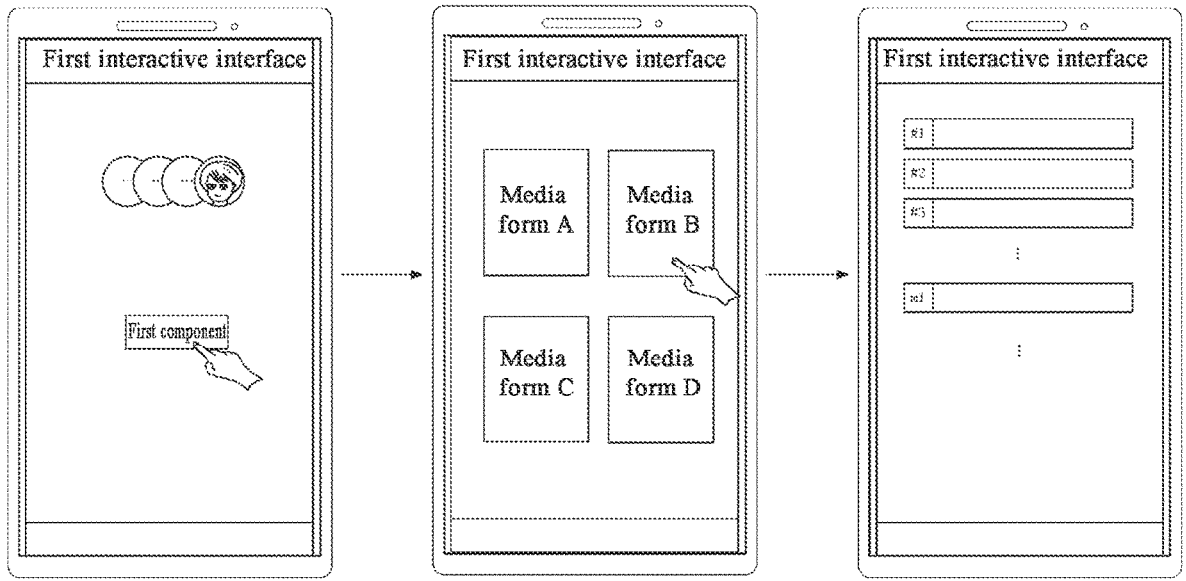
FIG. 4 is a schematic diagram of a process of obtaining target media provided in an embodiment of the present disclosure.

Exemplarily, in the first interactive interface, a plurality of media forms may be displayed on the basis of a trigger instruction input by the user, and the user determines the target media form from the plurality of media forms by operating the terminal device. Then, any piece of media data may be randomly obtained from the target media form as the target media. Exemplarily, FIG. 4 is a schematic diagram of a process of obtaining target media provided in an embodiment of the present disclosure, as shown in FIG. 4, a first component is disposed in the first interactive interface, after the first component is clicked, covers of the plurality of media forms (shown as a media form A, a media form B, a media form C and a media form D) are displayed in the first interactive interface, and each media form represents a type of song; then, the cover of the media form B is clicked to determine the media form B as the target media form, and optionally, the media data in the target media form (the media form B) is unfolded and displayed, and the media data is shown as media data #1, media data #2, media data #3 and the like in the figure. Afterwards, a song m1 is randomly selected, and the song m1 is played as the target media.

Figure 5:
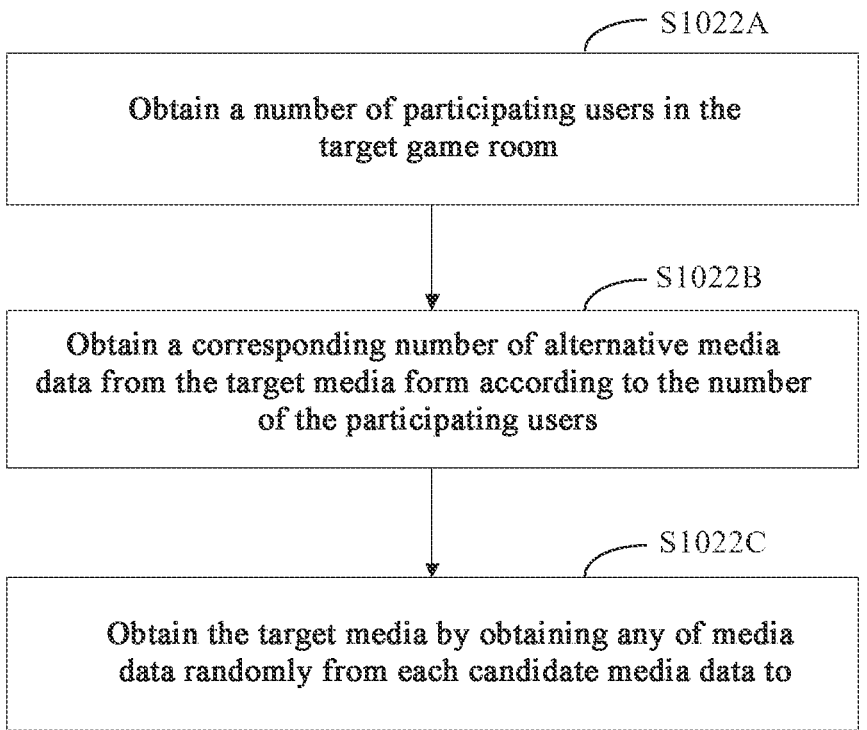
FIG. 5 is a flowchart of a specific implementation of step S1022 in the embodiment shown in FIG. 3.

During the process of obtaining the target media from the target media form, a corresponding number of target media may be determined on the basis of the user of participating users in the target game room. Exemplarily, as shown in FIG. 5, the specific implementation of the step S1022 includes:

Step S1022A: obtaining a number of participating users in the target game room.

Step S1022B: obtaining a corresponding number of alternative media data from the target media form according to the number of participating users.

Step S1022C: obtaining the target media by obtaining any piece of media data from the alternative media data randomly.

Exemplarily, the participating user in the target game room refers to a user who enters the target game room before the game starts and participates in the game after the game starts. In a possible implementation, a user identifier corresponding to each participating user, such as a user head portrait, is displayed in the first interactive interface; a corresponding number of alternative media data is obtained from the target media form according to the number of participating users in the target game room, for example, if the number of participating users in the target game room is 8, then 8 songs are obtained from the target media form, that is, each participating user corresponds to one song. Then, any piece of media data is randomly obtained from the alternative media data as the target media corresponding to a target user.

Step S103: in response to the target media being played to a target playing position, pausing the playing of the target media, and displaying first interaction information, the first interaction information is used for indicating a target user in the target game room.

Exemplarily, further, during the process of playing the target media in the first interactive interface, when the target media is played to the target playing position, the playing is paused, and at this time, the first interaction information used for indicating the target user is displayed to guide the target user to perform voice imitation on subsequent content. More specifically, for example, the target media is a segment of music video, and the video content is lyrics displayed in a rolling manner along with the playing of the music; when the music video is played to the position of a first sentence of lyrics (the target playing position) of chorus, the playing is paused, and the head portrait of the target user is highlighted in the first interactive interface, so as to prompt the target user to perform follow singing on the chorus part of the music video.

Exemplarily, afterwards, the target user inputs first response voice to imitate the media content after the target playing position of the target media. Further, on the basis of the consistency between voice content of the first response voice and media content of the target media after the target playing position, corresponding second interaction information is obtained. The second interaction information may be manually input by the user, and may also be obtained by the terminal device after performing processing on the basis of first application voice input by the target user. In a possible implementation, the second interaction information includes first judgment information or second judgment information, and the first judgment information represents that the voice content of the first response voice is consistent with the media content of the target media after the target playing position; and the second determination information represents that the voice content of the first response voice is inconsistent with the media content of the target media after the target playing position. More specifically, the second interaction information may be "passed" or "not passed", so as to evaluate the imitation effect of the target user on the media content after the target playing position.

Step S104: displaying second interaction information in the first interactive interface, the second interaction information representing a consistency between voice content of a first response voice input by the target user and target information, and the target information representing media content of the target media after the target playing position.

Further, after the second interaction information is obtained, the second intersection is displayed in the first interactive interface, thereby representing whether the first response voice input by the target user meets the imitation of the media content after the target playing position. More specifically, for example, when the second interaction information displayed in the first interactive interface is "passed", it represents that a song (the first response voice) sung by the target user is consistent with the chorus (the media content after the target playing position) of a target song (the target media); and on the contrary, when the second interaction information displayed in the first interactive interface is "not passed", it represents that the song sung by the target user is inconsistent with the chorus the target song. Afterwards, when the second interaction information is "not passed", the target user may be punished on the basis of a specific game rule, so as to implement a specific game flow, and details are not described herein again.

Figure 6:
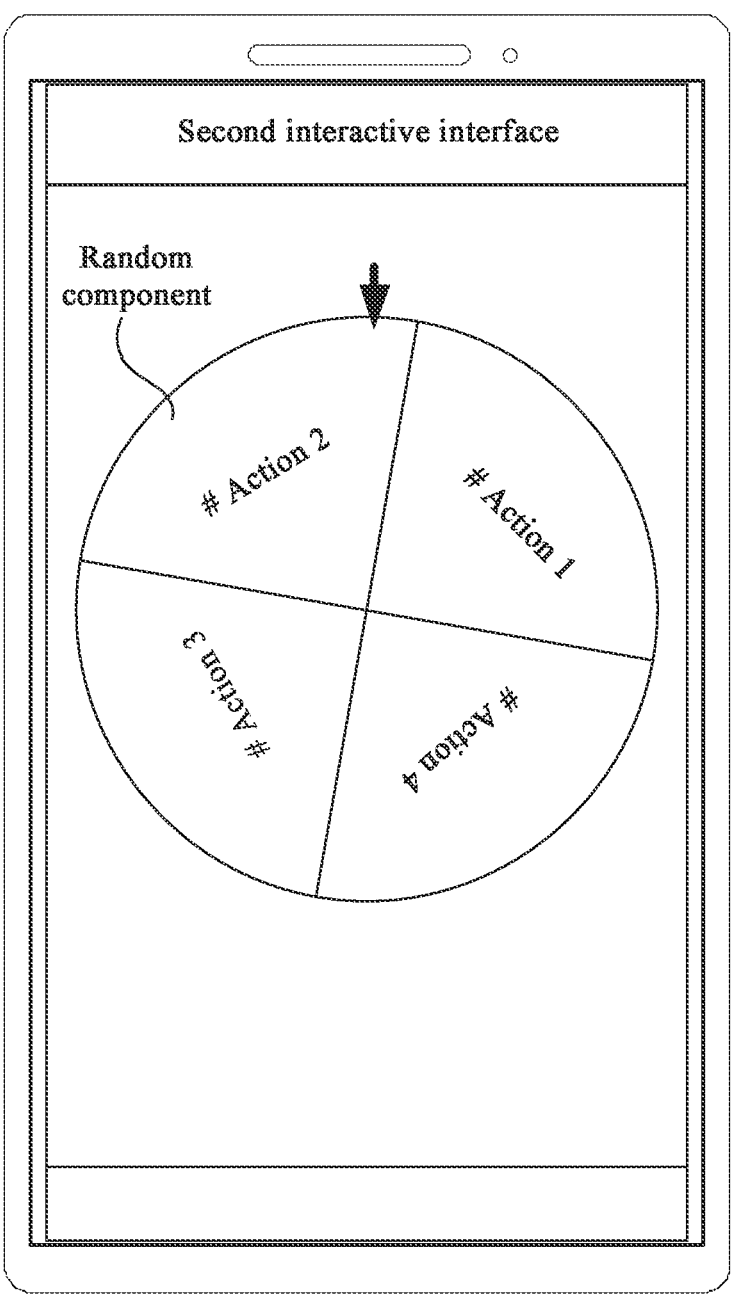
FIG. 6 is a schematic diagram of a second interactive interface provided in an embodiment of the present disclosure.

Optionally, when the second interaction information includes the second determination information, the method further includes: displaying a random component in a second interactive interface, wherein the random component is used for randomly determining one piece of target action information from at least two pieces of preset action information, the action information is used for representing a behavior action of the user, and more specifically, a "punishment" action in the voice imitation game. FIG. 6 is a schematic diagram of a second interaction interface provided in an embodiment of the present disclosure, the random component is disposed in the second interaction interface, as shown in FIG. 6, the appearance of the random component is a wheel disc, different behavior actions are displayed on different wheel lattices of the wheel disc, the random component is manually or automatically triggered to drive the wheel disc to rotate, so as to randomly determine a piece of target action information, for example, as shown in the figure, after the random component is triggered, among an action #1, an action #2, an action #3 and an action #4, the action #2 may be randomly determined as a target action, that is, the target action information.

Step S105: in response to the target user being not a last participating user in the target game room, returning to the step S102, and otherwise, ending.

Exemplarily, after the second interaction information is displayed, the game flow of the user for the current round of the user, that is, the voice imitation and evaluation of the target user, is completed, and then the game flow of the next user in the target game room, for example, a second user, is started, that is, the step S102 is returned, and the above steps are repeatedly executed; and if the target user is the last participating user in the target game room, that is, the right sides of the game corresponding to other participating users are all completed, then the circulation is ended, and the game ends.

In the present embodiment, the first interactive interface corresponding to the target game room is displayed; the target media is obtained, and the target media is displayed in the first interactive interface; when the target media is played to the target playing position, the playing of the target media is paused, and the first interaction information is displayed, wherein the first interaction information is used for indicating the target user in the target game room; and the second interaction information is displayed in the first interactive interface, wherein the second interaction information represents the consistency between the voice content of the first response voice input by the target user and the target information, and the target information represents the media content of the target media after the target playing position. During the process of playing the target media in the target game room, automatic pause is performed at the target playing position to display the first interaction information, so as to guide the speaking, and then the second interaction information is generated and displayed on the basis of the consistency between the first response voice of the target user and the target information in the target media, so as to evaluate the first response voice. Therefore, automatic guidance and propulsion of the game flow are realized, the efficiency of performing the game flow is improved, and the game fluency is improved.

Referring to FIG. 7, FIG. 7 is a second schematic flowchart of an interactive information display method provided in an embodiment of the present disclosure. On the basis of the embodiment shown in FIG. 2, the solution is further refined in the present embodiment, and the interactive information display method includes:

Step S201: determining the participating users in the target game room according to a joining request sent by at least one terminal device.

Exemplarily, the interactive information display method provided in the present embodiment may be applied to a voice imitation game in an online mode or an online and offline mixed mode, and different users operate terminal devices to run application program clients to communicate with a server, so as to join the target game room, and specifically, the users in the game room include a homeowner user and participating users, the homeowner user is a user who creates the game room, the terminal device corresponding to the participating user sends the joining request to the server, the server synchronizes the request to the terminal device on one side of the homeowner user, and after the homeowner user sends a receiving instruction to the server, the participating user joins the target game room. Exemplarily, the terminal device may send the joining request by means of scanning a two-dimensional code corresponding to the target game room, and clocking an access link corresponding to the target game room, and the specific implementation will not be repeated herein again.

Step S202: obtaining voice order of the participating users in the target game room.

Step S203: arranging and displaying corresponding user identifiers in a first area of the first interactive interface sequentially according to the voice order.

Figure 8:
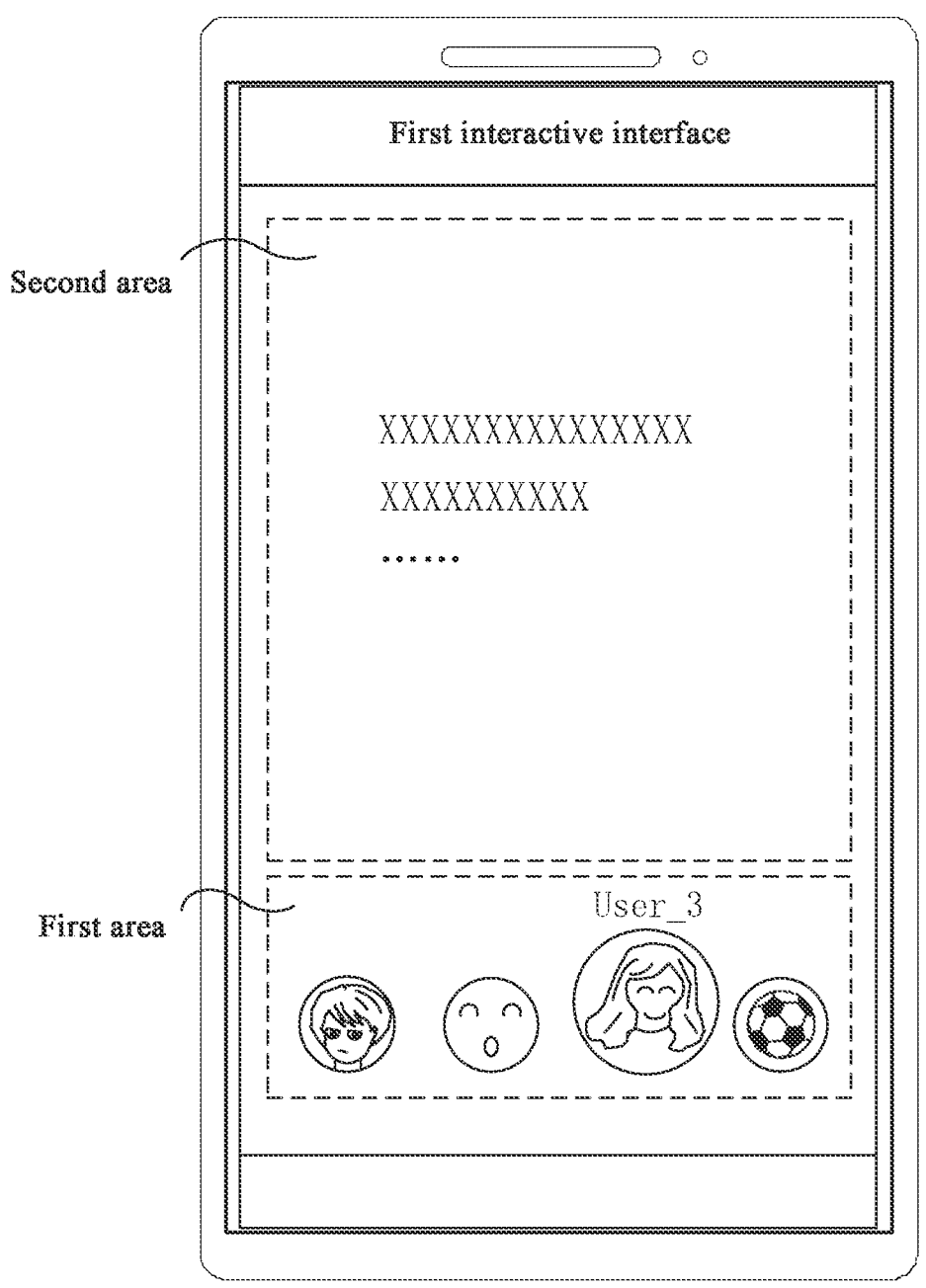
FIG. 8 is a schematic diagram of arranging and displaying user identifiers according to voice order provided in an embodiment of the present disclosure.

Further, after the participating user joins the target game room, in one possible manner, the user identifier corresponding to each participating user may be displayed in the first interactive interface according to a user nickname, a user number, the user activity, or the order of the target game room, and the like. In another possible manner, the voice order of each participating user may be generated randomly or according to a preset rule, and the voice order is a speaking order of voice imitation of each participating user after the game is subsequently started. Meanwhile, in the first area of the first interactive interface corresponding to the target game room, the user identifiers of the participating users are arranged and displayed according to the speaking orders. FIG. 8 is a schematic diagram of arranging and displaying the user identifiers according to the voice order provided in an embodiment of the present disclosure, as shown in FIG. 8, the first interactive interface may include a first area and a second area, wherein the second area is used for displaying the target media, for example, displaying the lyrics (represented by X in the figure) of the song; and the first area is used for displaying the head portrait of each participating user in the target game room, and in a game process, the participating users sequentially sing the song from left to right according to the head portrait orders, so as to implement a game mode such as song solitaire. The corresponding user identifiers are sequentially arranged and displayed in the first area, so that the participating users can observe the respective speaking orders, thereby propelling the game progress.

In a possible implementation, the specific implementation of the step S202 includes:

Step S2021: obtaining activeness information corresponding to the participating users.

Step S2022: generating the voice order of the participating users according to the activeness information.

Exemplarily, the activeness information may include information such as the round of the user participating in the game, an online duration, the number of times of speech, and the like. Sorting is performed on the basis of the activeness information, and the voice order of the participating users may be correspondingly generated according to a descending order, so that the user with better activeness speaks at first, thereby improving the participation interest and participation degree of the users, and better propelling the game flow.

Step S204: obtaining the number of participating users in the target game room, obtaining a corresponding number of alternative media data according to the number of participating users, and obtaining target media from the alternative media data.

Exemplarily, after at least one user enters the target game room, the game may be started on the basis of a user instruction. After the game is in a started state, the corresponding number of alternative media data is determined according to the number of participating users in the target game room, and the media data corresponding to a target user, that is, target media data, is randomly selected from the alternative media data. Meanwhile, after the game is in the started state, other users cannot enter the target game room. Exemplarily, if the server or the terminal device receives a second instruction through the server, the number of the alternative media data is updated, and the second instruction represents an exit action of the participating user for the target game room. That is, after the participating user in the target game room exits the room, the number of the alternative media data is synchronously reduced.

Step S205: obtaining an starting playing position of the target media, wherein the starting playing position is a position of a first playing duration in front of the target playing position of the target media.

Step S206: playing the target media starting from the starting playing position.

Step S207: in response to the target media being played to a target playing position, pausing the playing of the target media, and displaying first interaction information, the first interaction information being used for indicating a target user in the target game room.

Exemplarily, the starting playing position and the target playing position constitute a playing section, and partial display of the media data is realized by playing the playing section of the media data, thereby achieving a role of prompting. For example, the target media is a segment of music video, the starting playing position may be a playing time corresponding to first two sentences before the chorus in the music video starts, and the corresponding target playing position is a corresponding playing time at the beginning of the chorus. That is, when the music video (the target media) is played, the playing is started from the position of the first two sentences of the chorus until playing to the position where the chorus starts, and the chorus part is prolonged if there is a target user subsequently. During this process, the music video starts to be played from the position of the first two sentences of the chorus until playing to the position where the chorus starts, thereby playing a role of accurately indicating the voice imitation content. Therefore, the user can obtain the content (the first response voice) that needs to be sung subsequently according to the played target media. Further, when the target media is played to the target playing position, the playing of the music video is paused, and the first interaction information is displayed, so as to guide the target user indicated by the first interaction information to sing, thereby achieving the purpose of propelling the game flow.

Step S208: in response to displaying the first interaction information, highlighting, in the first area, a user identifier corresponding to the target user.

Referring to FIG. 8, when the first interaction information (User_3) is displayed, a user head portrait corresponding to the target user User_3 is highlighted in the first area, as shown in the figure, the head portrait of the target user User_3 is enlarged and displayed, thereby improving the display effect.

Step S209: obtaining a first response voice input by the target user.

Step S210: obtaining second interaction information according to the first response voice.

Further, under the guidance of playing the target media and displaying the first interaction information, the target user subsequently inputs the first response voice, for example, the voice of the target user for singing the song. After receiving the first response voice, the terminal device processes the first response voice to obtain the second intersection information for representing the consistency between the voice content of the first response voice and the media content of the target media after the target playing position.

Figure 9:
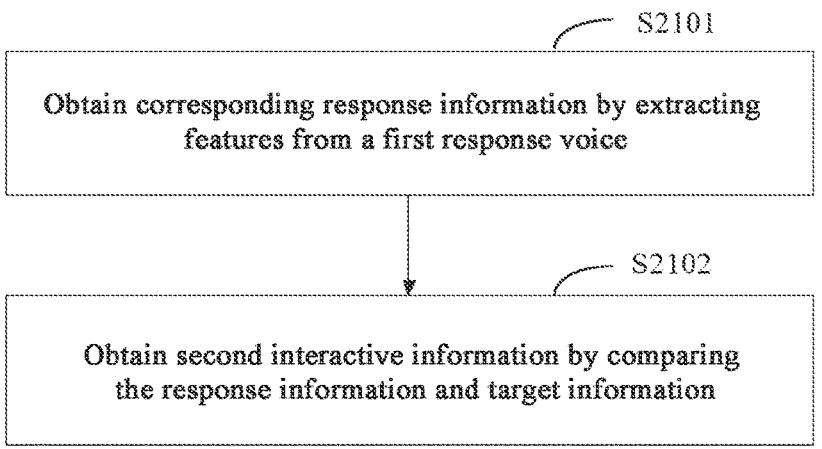
FIG. 9 is a flowchart of a specific implementation of step S210 in the embodiment shown in FIG. 7.

In a possible implementation, as shown in FIG. 9, the specific implementation of the step S210 includes:

Step S2101: obtaining corresponding response information by performing feature extraction on the first response voice.

Step S2102: obtaining the second interaction information by comparing the response information with the target information.

Exemplarily, according to the obtained first response voice, feature extraction is performed on the first response voice to obtain the corresponding response information, and the response information includes a feature matrix for representing the media content, wherein the media content may include text content, which may include music content and image content, therefore based on the specific implementation, the feature matrix may be used for representing texts, and may also be used for representing a music melody. Then, the similarity between application information and the target information is calculated to obtain the second interaction information. The target information may be a feature matrix of the media content of the target media after the target playing position, and the content represented by the feature matrix has the same type as the content of the feature matrix corresponding to the response information. The specific implementation method of calculating the similarity between two feature means is prior art, and thus details are not described herein again.

Further, in a possible implementation, the response information includes response texts; and the target information includes target texts for representing the media content of the target media after the target playing position, and the second interaction information includes a consistency score for representing a percentage of consistency between the content of the first response voice and the target information. The specific implementation steps of the step S2102 include:

Step S2102A: obtaining a text repetition rate of the response texts relative to the target texts by comparing the response texts with the target texts character by character.

Step S2102B: obtaining the consistency score according to the text repetition rate.

Exemplarily, after feature extraction is performed on the first response voice to obtain the corresponding response texts, the response texts are compared with the target texts corresponding to the target information character by character, and the text repetition rate of the response texts relative to the target texts is obtained on the basis of the ratio of the number of repeated texts of the response texts and the target texts to the total number of the target texts. More specifically, the text repetition rate is a normalized value, the maximum text repetition rate is 1, and when the text repetition rate is 1, it represents that the response texts are completely consistent with the target texts; and when the text repetition rate is 0, it represents that the response texts are completely inconsistent with the target texts. Further, after weighted correction is performed on the text repetition rate, the consistency score, that is, the second interaction information, is obtained. Then, the consistency score may be judged, for example, when the consistency score is greater than a threshold value, "passed" is displayed; and when the consistency score is less than or equal to the threshold value, "not passed" is displayed. Therefore, whether the first response voice input by the target user meets the requirements of voice imitation is indicated, and thus a subsequent game flow is propelled.

In the present embodiment, by means of performing voice recognition on the first response voice input by the target user, whether the first response voice meets the requirements of voice imitation is automatically detected, thereby automatically propelling the subsequent flow, improving the propulsion efficiency of the game flow and the game fluency, and reducing manual operations.

In another possible implementation, the response information includes a voice melody feature; and the target information includes a target melody feature for representing the media content of the target media after the target playing position, and the specific implementation step of the step S2102 includes: obtaining the second interaction information according to the similarity between the voice melody feature and the target melody feature.

Specifically, the first response voice is, for example, singing voice of the user, and feature extraction is performed on the first response voice to obtain the voice melody feature therein, that is, the response information. Then, the response information is compared with the target information, that is, the collected voice melody feature corresponding to the first response voice emitted by the user is compared with the target melody feature for representing the media content of the target media after the target playing position, and feature similarity is calculated to obtain the corresponding second interaction information, the second interaction information represents a similarity value between the response information and the target information, and more specifically, that is, the consistency between the first response voice and the media content of the target media after the target playing position in terms of melody.

In the present embodiment, by means of performing melody feature extraction on the first response voice input by the target user, whether the first response voice is consistent with the melody in the target media is automatically detected, thereby realizing automatic propulsion of the subsequent flow, improving the propulsion efficiency of the game flow and the game fluency, and reducing manual operations. Further, it should be noted that the two specific implementations of the step S2102 shown in the above embodiment may alternatively be executed, and may also be executed together, that is, the response text and the voice melody feature corresponding to the first response voice are judged at the same time, so as to generate the corresponding second interaction information according to judgement results. The specific implementation may be set as needed, and details are not described herein again.

In another possible implementation, the specific implementation of the step S210 includes:

Step S2103: sending the first response voice, respectively, to terminal devices corresponding to the participating users in the target game room.

Step S2104: generating the second interaction information according to third interaction information sent by terminal devices corresponding to at least one participating user in the target game room, wherein the third interaction information represents a determination result of the corresponding participating user on the consistency between the voice content of the first response voice and the target information.

Exemplarily, in the received first response voice, the first response voice is respectively distributed to each participating user in the target game room through the server, and then each participating user manually judges whether the voice content corresponding to the first response voice is consistent with the media content corresponding to the target information (for example, whether the lyrics of the song sung by the target user are consistent with the lyrics of a target song). Then, each terminal device represents the determination result of the consistency between the voice content of the first response voice and the target information by means of sending the third interaction information. Therefore, the second interaction information is generated according to the third interaction information sent by each terminal device. More specifically, for example, the third interaction information sent by a participating user User_1 and a participating user User_2 is a first determination result, and the first determination result represents that the voice content of the first response voice is consistent with the media content corresponding to the target information. The third interaction information sent by a participating user User_3 is a second determination result, and the second determination result represents that the voice content of the first response voice is inconsistent with the media content corresponding to the target information. The second interaction information is obtained according to a number relationship between the first determination result and the second determination result, the second interaction information is a determination result with a greater number, that is, the second determination result, that is, the voice content of the first response voice is inconsistent with the media content corresponding to the target information.

In the present embodiment, by means of respectively sending the first response voice to the terminal devices corresponding to the participating users in the target game room, and generating, according to the third interaction information sent by the terminal devices, the second interaction information for representing the consistency between the voice content of the response voice and the target information, the interactivity between the participating users is improved, and the interaction efficiency is improved.

Step S211: displaying the second interaction information in the second area of the first interactive interface.

Step S212: in response to the target user being the last participating user corresponding to a voice order, adding the game round by one, and executing step S213; and otherwise, updating the target user to be the next participating user corresponding to the voice order, and returning to the step S204.

Figure 10:
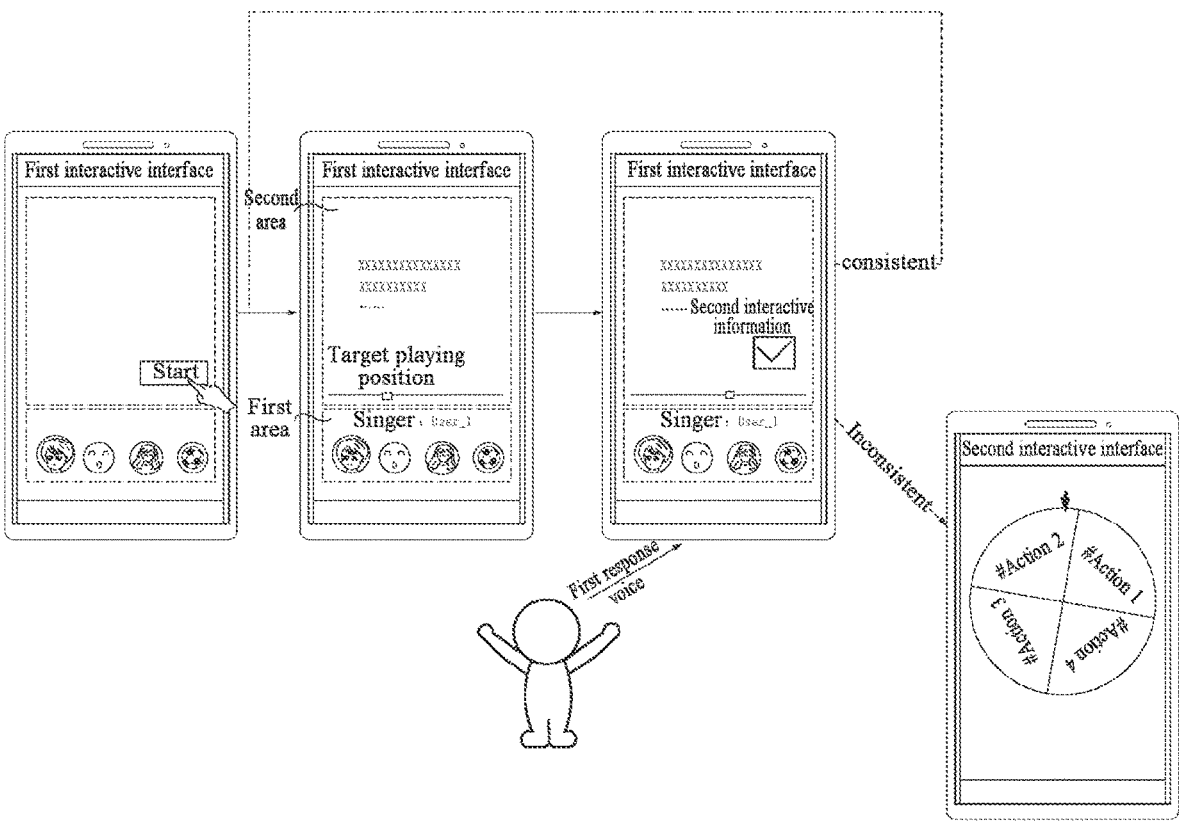
FIG. 10 is a schematic diagram of a process of displaying second interaction information provided in an embodiment of the present disclosure.

Exemplarily, after the second interaction information is determined, the second interaction information is displayed in a first interaction page, FIG. 10 is a schematic diagram of a process of displaying the second interaction information provided in an embodiment of the present disclosure, and the above process is further described in conjunction with FIG. 10. As shown in FIG. 10, after the homeowner user creates a target game room, the participating user enters the target game room, the user head portraits of the homeowner user and the participating user are displayed in the first area of the first interactive interface corresponding to the target game room, and then a target video is displayed in the second area of the first interactive interface after a "start" button shown in the figure is clicked. Exemplarily, lyrics (shown as X in the figure) are played in a scrolling manner in a content diagram of the target video, and after the target video is played to a target position, a user name (shown as "singer: User_1") of the target user is displayed in the first area of the first interactive interface, so as to prompt the target user to input the first response voice to sing the song. Then, according to the first response voice input by the target user, the second interaction information is displayed in the second area of the first interactive interface, so as to prompt whether the lyrics sung by the target user are consistent with the lyrics at the target playing position in the target video. The second interaction information may be a text or an identifier, for example, an identifier of a "hook" style shown in the figure, so as to indicate consistency. Then, if the second interaction information represents that the lyrics sung by the target user are consistent with the lyrics at the target playing position (shown as "consistent" in the figure), the next user is polled according to the sorting order of the user head portrait in the first area, and the above process is repeated; and if the second interaction information represents that the lyrics sung by the target user are inconsistent with the lyrics at the target playing position, a second interactive interface is displayed, the content of "punishment" for the target user (shown as action #1, action #2, action #3 and action #4 in the figure) is displayed, so as to enter a punishment link of the game. The present round of game is ended until all participating users in the room complete the above flow (i.e., each participating user has input the first response voice), and the total game round is recorded.

Optionally, after the step S212, the method further includes:

Step S213: obtaining a game round and a login state.

Step S214: in response to the login state being a non-login state and the game round being a target round, displaying a third interactive interface, the third interactive interface being used for logging in or downloading an application program corresponding to the target game room.

Exemplarily, after each round of game is ended, the total game round and the login state are obtained, wherein the login state refers to a login state of the terminal device when running the application program, and if the login state is the non-login state, after reaching the target round, for example, after 3 rounds of game, a third interaction page is popped up, so that the user logs in and downloads the game, thereby improving the matching speed of the user in the game process.

In the present embodiment, the step S207 is consistent with the step S103 in the above embodiment, therefore with regard to detailed discussion, reference may be made to the discussion of the step S103, and thus details are not described herein again.

Figure 11:
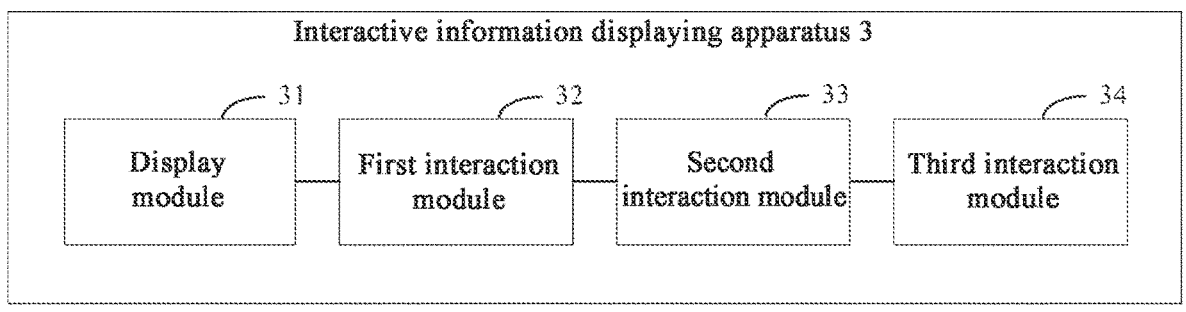
FIG. 11 is a structural block diagram of an interactive information display apparatus provided in an embodiment of the present disclosure.

Corresponding to the interactive display method in the above embodiments, FIG. 11 is a structural block diagram of an interactive information display apparatus provided in an embodiment of the present disclosure. For the convenience of description, only parts related to the embodiments of the present disclosure are illustrated. Referring to FIG. 11, the interactive information display apparatus 3 includes:

a display module 31, configured to display a first interactive interface corresponding to a target game room;

a first interaction module 32, configured to obtain target media, and play the target media in the first interactive interface;

a second interaction module 33, configured to: in response to the target media being played to a target playing position, pause the playing of the target media, and display first interaction information, the first interaction information being used for indicating a target user in the target game room; and a third interaction module 34, configured to display second interaction information in the first interactive interface, the second interaction information representing a consistency between voice content of a first response voice input by the target user and target information, the target information representing media content of the target media after the target playing position.

In one embodiment of the present disclosure, when obtaining the target media, the first interaction module 32 is specifically configured to: determine a target media form based on a first instruction, wherein the target media form comprises at least one piece of media data of a target type; and obtain the target media from the target media form.

In one embodiment of the present disclosure, when obtaining the target media from the target media form, the first interaction module 32 is specifically configured to: obtain the number of participating users in the target game room; obtain a corresponding number of alternative media data from the target media form according to the number of participating users; and obtain the target media by obtain any piece of media data randomly from the alternative media data.

In one embodiment of the present disclosure, before obtaining the number of participating users in the target game room, the first interaction module 32 is further configured to: in response to receiving a second instruction, update the number of the alternative media data, wherein the second instruction represents an exit action of the participating user for the target game room.

In one embodiment of the present disclosure, before obtaining the target media, the display module 31 further includes: determine the participating users in the target game room according to a joining request sent by at least one terminal device; and display, in the first interactive interface, user identifiers corresponding to the participating users.

In one embodiment of the present disclosure, when displaying, in the first interactive interface, the user identifiers corresponding to the participating users, the display module 31 is specifically configured to: obtain voice order of the participating users in the target game room; and according to the voice order, arrange and display the corresponding user identifiers sequentially in a first area of the first interactive interface; and the display module 31 is further configured to: in response to the first interaction information being displayed, highlight, in the first area, the user identifier corresponding to the target user.

In one embodiment of the present disclosure, when obtaining the voice order of the participating users in the target game room, the display module 31 is specifically configured to: obtain activeness information corresponding to the participating users; and generate the voice order of the participating users according to the activeness information.

In one embodiment of the present disclosure, before displaying the second interaction information in the first interactive interface, the third interaction module 34 is further configured to: obtain the first response voice input by the target user; obtain corresponding response information by performing feature extraction on the first response voice;

and obtain the second interaction information by comparing the response information with the target information.

In one embodiment of the present disclosure, the response information includes response texts; the target information includes target texts for representing the media content of the target media after the target playing position, and the second interaction information includes a consistency score for representing a percentage of consistency between the content of the first response voice and the target information; and when obtain the second interaction information by comparing the response information with the target information, the third interaction module 34 is specifically configured to: obtain a text repetition rate of the response texts relative to the target texts by comparing the response texts with the target texts character by character; and obtain the consistency score according to the text repetition rate.

In one embodiment of the present disclosure, the response information includes a voice melody feature; the target information includes a target melody feature representing the media content of the target media after the target playing position; and when obtain the second interaction information by comparing the response information with the target information, the third interaction module 34 is specifically configured to: obtain the second interaction information according to the similarity between the voice melody feature and the target melody feature.

In one embodiment of the present disclosure, before displaying the second interaction information in the first interactive interface, the third interaction module 34 is further configured to: obtain the first response voice input by the target user; send the first response voice, respectively, to terminal devices corresponding to the participating users in the target game room; and generate the second interaction information according to third interaction information sent by the terminal device corresponding to at least one participating user in the target game room, wherein the third interaction information represents a determination result of the corresponding participating user on the consistency between the voice content of the first response voice and the target information.

In one embodiment of the present disclosure, when playing the target media in the first interactive interface, the first interaction module 32 is specifically configured to: obtain an starting playing position, wherein the starting playing position is a position of a first playing duration in front of the target playing position of the target media; and play the target media starting from the starting playing position.

In one embodiment of the present disclosure, the second interaction information includes first judgment information or second judgment information, wherein the first judgment information represents that the voice content of the first response voice is consistent with the target information; the second determination information represents that the voice content of the first response voice is inconsistent with the target information; and in response to the second interaction information including the second judgment information, the display module 31 is further configured to: display a random component in a second interactive interface, wherein the random component is used for randomly determining one piece of target action information from at least two pieces of preset action information, and the action information is used for representing a behavior action of the user.

In one embodiment of the present disclosure, the display module 31 is further configured to: obtain a game round and a login state; and when the login state is a non-login state and the game round is a target round, display a third interactive interface, wherein the third interactive interface is used for logging in or downloading an application program corresponding to the target game room.

The display module 31, the first interaction module 32, the second interaction module 33 and the third interaction module 34 are connected in order. The interactive information display apparatus 3 provided in the present embodiment may execute the technical solutions of the foregoing method embodiments, and the implementation principles and technical effects thereof are similar, thus details are not described herein again.

Figure 12:
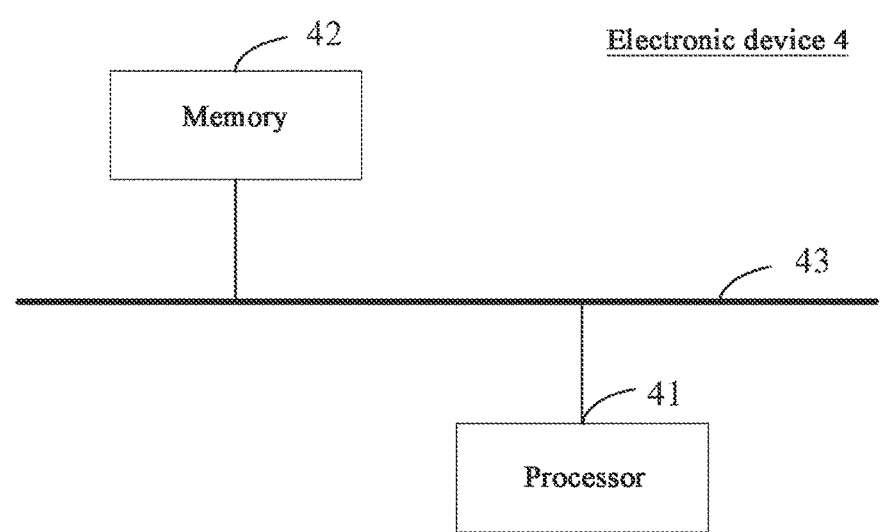
FIG. 12 is a schematic structural diagram of an electronic device provided in an embodiment of the present disclosure.

FIG. 12 is a schematic structural diagram of an electronic device provided in an embodiment of the present disclosure, and as shown in FIG. 12, the electronic device 4 includes:

a processor 41, and a memory 42 in communication connection with the processor 41;

the memory 42 stores a computer execution instruction; and the processor 41 executes the computer execution instruction stored in the memory 41, so as to implement the interactive information display method in the embodiments shown in FIG. 2 to FIG. 10.

Optionally, the processor 41 and the memory 42 are connected through a bus 43.

Related description may refer to the description and effects corresponding to the steps in the embodiments corresponding to FIG. 2 to FIG. 10 for understanding, and thus details are not described herein.

An embodiment of the present disclosure provides a non-transitory computer-readable storage medium, wherein computer execution instructions are stored in the non-transitory computer-readable storage medium, and when executed by a processor, the computer execution instructions are used for implementing the interactive information display method provided in any embodiment among embodiments corresponding to FIG. 2 to FIG. 10 in the present application.

Figure 13:
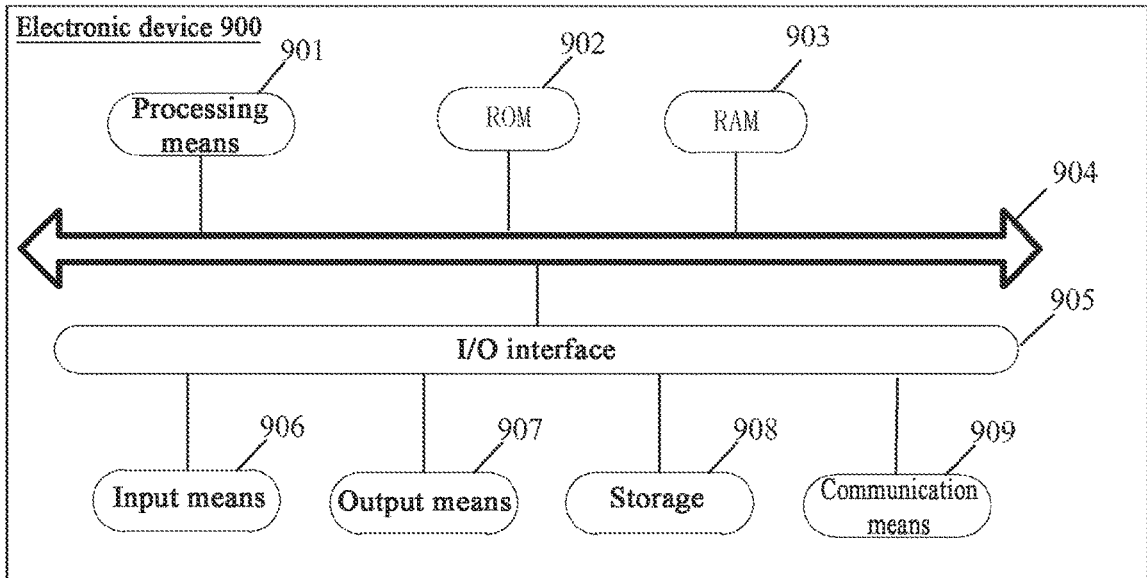
FIG. 13 is a schematic diagram of a hardware structure of an electronic device provided in an embodiment of the present disclosure.

Referring to FIG. 13, it illustrates a schematic structural diagram of an electronic device 900 suitable for implementing the embodiments of the present disclosure. The electronic device 900 may be a terminal device or a server. The terminal device may include, but is not limited to, mobile terminals such as mobile phones, notebook computers, digital broadcast receivers, personal digital assistants (PDAs for short), portable Android devices (PADs for short), portable media players (PMPs for short), vehicle-mounted terminals (e.g., vehicle-mounted navigation terminals), and the like, and fixed terminals such as digital TVs, desktop computers, and the like. The electronic device shown in FIG. 13 is merely an example, and should not bring any limitation to the functions and use ranges of the embodiments of the present disclosure.

As shown in FIG. 13, the electronic device 900 may include a processing apparatus (e.g., a central processing unit, a graphics processing unit, or the like) 901, which may perform various suitable actions and processes in accordance with a program stored in a read only memory (ROM for short) 902 or a program loaded from a storage apparatus 908 into a random access memory (RAM for short) 903. In the RAM 903, various programs and data needed by the operations of the electronic device 900 are also stored. The processing apparatus 901, the ROM 902 and the RAM 903 are connected to each other via a bus 904. An input/output (I/O) interface 905 is also connected to the bus 904.

In general, the following apparatuses may be connected to the I/O interface 905: an input apparatus 906, including, for example, a touch screen, a touch pad, a keyboard, a mouse, a camera, a microphone, an accelerometer, a gyroscope, and the like; an output apparatus 907, including, for example, a liquid crystal display (LCD for short), a speaker, a vibrator, and the like; a storage apparatus 908, including, for example, a magnetic tape, a hard disk, and the like; and a communication apparatus 909. The communication apparatus 909 may allow the electronic device 900 to communicate in a wireless or wired manner with other devices to exchange data. Although FIG. 13 illustrates the electronic device 900 having various apparatuses, it should be understood that not all illustrated apparatuses are required to be implemented or provided. More or fewer apparatuses may alternatively be implemented or provided.

In particular, according to the embodiments of the present disclosure, the processes described above with reference to the flowcharts may be implemented as computer software programs. For example, the embodiments of the present disclosure include a computer program product, which includes a computer program carried on a computer-readable medium, and the computer program contains program codes for performing the method illustrated in the flowcharts. In such embodiments, the computer program may be downloaded and installed from a network via the communication apparatus 909, or installed from the storage apparatus 908, or installed from the ROM 902. When the computer program is executed by the processing apparatus 901, the above functions defined in the method of the embodiments of the present disclosure are performed.

It should be noted that, the computer-readable medium described above in the present disclosure may be either a computer-readable signal medium or a computer-readable storage medium, or any combination of the two. The computer-readable storage medium may be, for example, but is not limited to, an electronic, magnetic, optical, electromagnetic, infrared, or semiconductor system, apparatus or device, or a combination of any of the above. More specific examples of the computer-readable storage medium may include, but are not limited to: an electrical connection having one or more wires, a portable computer magnetic disk, a hard disk, a random access memory (RAM), a read only memory (ROM), an erasable programmable read only memory (EPROM or a flash memory), an optical fiber, a portable compact disc read only memory (CD-ROM), an optical storage device, a magnetic storage device, or any suitable combination of the above. In the present disclosure, the computer-readable storage medium may be any tangible medium that contains or stores a program, wherein the program may be used by or in conjunction with an instruction execution system, apparatus or device. In the present disclosure, the computer-readable signal medium may include a data signal that is propagated in a baseband or as part of a carrier, wherein the data signal carries computer-readable program codes. Such propagated data signal may take many forms, including, but not limited to, electromagnetic signals, optical signals, or any suitable combination thereof. The computer-readable signal medium may also be any computer-readable medium other than the computer-readable storage medium, and the computer-readable signal medium may send, propagate or transport the program for use by or in conjunction with the instruction execution system, apparatus or device. Program codes contained on the computer-readable medium may be transmitted with any suitable medium, including, but not limited to: an electrical wire, an optical cable, RF (radio frequency), and the like, or any suitable combination thereof.

The computer-readable medium may be contained in the above electronic device; and it may also be present separately and is not assembled into the electronic device.

The computer-readable medium carries one or more programs that, when executed by the electronic device, cause the electronic device to execute the method shown in the above embodiments.

Computer program codes for executing the operations of the present disclosure may be written in one or more programming languages or combinations thereof. The programming languages include object-oriented programming languages, such as Java, Smalltalk, C++, and conventional procedural programming languages, such as the "C" language or similar programming languages. The program codes may be executed entirely on a user computer, executed partly on the user computer, executed as a stand-alone software package, executed partly on the user computer and partly on a remote computer, or executed entirely on the remote computer or a server. In the case involving the remote computer, the remote computer may be connected to the user computer through any type of network, including a local area network (LAN for short) or a wide area network (WAN for short), or it may be connected to an external computer (e.g., through the Internet using an Internet service provider).

The flowcharts and block diagrams in the drawings illustrate the system architecture, functions and operations of possible implementations of systems, methods and computer program products according to various embodiments of the present disclosure. In this regard, each block in the flowcharts or block diagrams may represent a part of a module, a program segment, or a code, which contains one or more executable instructions for implementing specified logical functions. It should also be noted that, in some alternative implementations, the functions annotated in the block may occur out of the order annotated in the drawings. For example, two blocks shown in succession may, in fact, be executed substantially concurrently, or the blocks may sometimes be executed in a reverse order, depending upon the functions involved. It should also be noted that each block in the block diagrams and/or flowcharts, and combinations of the blocks in the block diagrams and/or flowcharts may be implemented by dedicated hardware-based systems for performing specified functions or operations, or combinations of dedicated hardware and computer instructions.

The units involved in the described embodiments of the present disclosure may be implemented in a software or hardware manner. The names of the units do not constitute limitations of the units themselves in a certain case. For example, a first acquisition unit may also be described as "a unit for obtaining at least two Internet Protocol addresses".

The functions described herein above may be performed, at least in part, by one or more hardware logic components. For example, without limitation, example types of the hardware logic components that may be used include: a field programmable gate array (FPGA), an application specific integrated circuit (ASIC), an application specific standard product (ASSP), a system on chip (SOC), a complex programmable logic device (CPLD), and so on.

In the context of the present disclosure, a machine-readable medium may be a tangible medium, which may contain or store a program for use by or in conjunction with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium would include an electrical connection based on one or more wires, a portable computer disk, a hard disk, a random access memory (RAM), a read only memory (ROM), an erasable programmable read only memory (EPROM or a flash memory), an optical fiber, a compact disc-read only memory (CD-ROM), an optical storage device, a magnetic storage device, or any suitable combination thereof.

In a first aspect, according to one or more embodiments of the present disclosure, provided is an interactive information display method, including:

displaying a first interactive interface corresponding to a target game room; obtaining target media, and playing the target media in the first interactive interface; in response to the target media being played to a target playing position, pausing the playing of the target media, and displaying first interaction information, the first interaction information is used for indicating a target user in the target game room; and displaying second interaction information in the first interactive interface, the second interaction information representing a consistency between voice content of a first response voice input by the target user and target information, and the target information representing media content of the target media after the target playing position.

According to one or more embodiments of the present disclosure, the step of obtaining the target media includes: determining a target media form based on a first instruction, the target media form comprising at least one piece of media data of a target type; and obtaining the target media from the target media form.

According to one or more embodiments of the present disclosure, the step of obtaining the target media from the target media form includes: obtaining a number of participating users in the target game room; obtaining alternative media data from the target media form according to the number of participating users; in response to receiving a second instruction, updating a number of the alternative media data, the second instruction representing an exit action of the participating user for the target game room; and obtaining the target media by obtaining any piece of media data from the alternative media data randomly.

According to one or more embodiments of the present disclosure, before the step of obtaining the target media, the method further includes: determining the participating users in the target game room according to a joining request sent by at least one terminal device; and displaying, in the first interactive interface, user identifiers corresponding to the participating users.

According to one or more embodiments of the present disclosure, the step of displaying, in the first interactive interface, the user identifiers corresponding to the participating users includes: obtaining voice order of the participating users in the target game room; and arranging and displaying corresponding user identifiers in a first area of the first interactive interface sequentially according to the voice order; and the method further comprises: in response to displaying the first interaction information, highlighting, in the first area, a user identifier corresponding to the target user.

In one embodiment of the present disclosure, when obtaining the voice order of the participating users in the target game room, the display module 31 is specifically configured to: obtain activeness information corresponding to the participating users; and generate the voice order of the participating users according to the activeness information.

According to one or more embodiments of the present disclosure, before the step of displaying the second interaction information in the first interactive interface, the method further includes: obtaining a first response voice input by the target user; obtaining corresponding response information by performing feature extraction on the first response voice; and obtaining the second interaction information by comparing the response information with the target information.

According to one or more embodiments of the present disclosure, the response information includes response texts; the target information includes target texts for representing the media content of the target media after the target playing position, and the second interaction information includes a consistency score for representing a percentage of consistency between the content of the first response voice and the target information; and the step of comparing the response information with the target information to obtain the second interaction information includes: obtaining a text repetition rate of the response texts relative to the target texts by comparing the response texts with the target texts character by character; and obtaining the consistency score according to the text repetition rate.

According to one or more embodiments of the present disclosure, the response information includes a voice melody feature; the target information includes a target melody feature for representing the media content of the target media after the target playing position; and the step of obtaining the second interaction information by comparing the response information with the target information includes: obtaining the second interaction information according to a similarity between the voice melody feature and the target melody feature.

According to one or more embodiments of the present disclosure, before the step of displaying the second interaction information in the first interactive interface, the method further includes: obtaining a first response voice input by the target user; sending the first response voice, respectively, to terminal devices corresponding to the participating users in the target game room; and generating the second interaction information according to third interaction information sent by terminal devices corresponding to at least one participating user in the target game room, wherein the third interaction information represents a determination result of the corresponding participating user on the consistency between the voice content of the first response voice and the target information.

According to one or more embodiments of the present disclosure, the step of playing the target media in the first interactive interface includes: obtaining an starting playing position, the starting playing position being a position of a first playing duration in front of the target playing position of the target media; and playing the target media starting from the starting playing position.

According to one or more embodiments of the present disclosure, the second interaction information comprises first judgment information or second judgment information, wherein the first judgment information represents that the voice content of the first response voice is consistent with the target information; the second determination information represents that the voice content of the first response voice is inconsistent with the target information; and in response to the second interaction information comprising the second judgment information, the method further includes: displaying a random component in a second interactive interface, the random component being used for determining one piece of target action information randomly from at least two pieces of preset action information, and the action information being used for representing a behavior action of the user.

According to one or more embodiments of the present disclosure, the method further includes: obtaining a game round and a login state; and in response to the login state being a non-login state and the game round being a target round, displaying a third interactive interface, the third interactive interface being used for logging in or downloading an application program corresponding to the target game room.

In a second aspect, according to one or more embodiments of the present disclosure, provided is an interactive information display apparatus, including:

a display module, configured to display a first interactive interface corresponding to a target game room;

a first interaction module, configured to obtain target media, and play the target media in the first interactive interface;

a second interaction module, configured to: in response to the target media being played to a target playing position, pause the playing of the target media, and display first interaction information, the first interaction information being used for indicating a target user in the target game room; and a third interaction module, configured to display second interaction information in the first interactive interface, the second interaction information representing a consistency between voice content of a first response voice input by the target user and target information, the target information representing media content of the target media after the target playing position.

According to one or more embodiments of the present disclosure, when obtaining the target media, the first interaction module is specifically configured to: determine a target media form based on a first instruction, the target media form comprising at least one piece of media data of a target type; and obtain the target media from the target media form.

According to one or more embodiments of the present disclosure, when obtaining the target media from the target media form, the first interaction module is specifically configured to: obtaining a number of participating users in the target game room; obtaining alternative media data from the target media form according to the number of participating users; in response to receiving a second instruction, updating a number of the alternative media data, the second instruction representing an exit action of the participating user for the target game room; and obtaining the target media by obtaining any piece of media data from the alternative media data randomly.

According to one or more embodiments of the present disclosure, before obtaining the target media, the display module further includes: determining the participating users in the target game room according to a joining request sent by at least one terminal device; and displaying, in the first interactive interface, user identifiers corresponding to the participating users.

According to one or more embodiments of the present disclosure, when displaying, in the first interactive interface, the user identifiers corresponding to the participating users, the display module is specifically configured to: obtain voice order of the participating users in the target game room; and arrange and display corresponding user identifiers in a first area of the first interactive interface sequentially according to the voice order; and the display module is further configured to: in response to displaying the first interaction information, highlighting, in the first area, a user identifier corresponding to the target user.

According to one or more embodiments of the present disclosure, when obtaining the voice order of the participating users in the target game room, the display module is specifically configured to: obtain the number of room friends corresponding to each participating user, wherein the number of room friends represents the number of other participating users having a friendship with the current participating user in the target game room; and generate the voice order of the participating users according to the number of room friends.

According to one or more embodiments of the present disclosure, before displaying the second interaction information in the first interactive interface, the third interaction module is further configured to: obtaining a first response voice input by the target user; obtaining corresponding response information by performing feature extraction on the first response voice; and obtaining the second interaction information by comparing the response information with the target information.

According to one or more embodiments of the present disclosure, the response information includes response texts; the target information includes target texts for representing the media content of the target media after the target playing position, and the second interaction information includes a consistency score for representing a percentage of consistency between the content of the first response voice and the target information; and when comparing the response information with the target information to obtain the second interaction information, the third interaction module is specifically configured to: obtaining a text repetition rate of the response texts relative to the target texts by comparing the response texts with the target texts character by character; and obtain the consistency score according to the text repetition rate.

According to one or more embodiments of the present disclosure, the response information includes a voice melody feature; the target information includes a target melody feature for representing the media content of the target media after the target playing position; and when comparing the response information with the target information to obtain the second interaction information, the third interaction module is specifically configured to: obtain the second interaction information according to the similarity between the voice melody feature and the target melody feature.

According to one or more embodiments of the present disclosure, before displaying the second interaction information in the first interactive interface, the third interaction module is further configured to: obtain the first response voice input by the target user; respectively send the first response voice to terminal devices corresponding to the participating users in the target game room; and generate the second interaction information according to third interaction information sent by the terminal device corresponding to at least one participating user in the target game room, wherein the third interaction information represents a determination result of the corresponding participating user on the consistency between the voice content of the first response voice and the target information.

According to one or more embodiments of the present disclosure, when playing the target media in the first interactive interface, the first interaction module is specifically configured to: obtain an starting playing position, wherein the starting playing position is a position of a first playing duration in front of the target playing position of the target media; and play the target media starting from the starting playing position.

According to one or more embodiments of the present disclosure, the second interaction information includes first judgment information or second judgment information, wherein the first judgment information represents that the voice content of the first response voice is consistent with the target information; the second determination information represents that the voice content of the first response voice is inconsistent with the target information; and when the second interaction information includes the second judgment information, the display module is further configured to: display a random component in a second interactive interface, wherein the random component is used for randomly determining one piece of target action information from at least two pieces of preset action information, and the action information is used for representing a behavior action of the user.

According to one or more embodiments of the present disclosure, the display module is further configured to: obtain a game round and a login state; and when the login state is a non-login state and the game round is a target round, display a third interactive interface, wherein the third interactive interface is used for logging in or downloading an application program corresponding to the target game room.

In a third aspect, according to one or more embodiments of the present disclosure, provided is an electronic device, including: a processor, and a memory in communication connection with the processor;

the memory stores a computer execution instruction; and
the processor executes the computer execution instruction stored in the memory, so as to implement the interactive information display method in the first aspect and various possible designs of the first aspect.

In a fourth aspect, according to one or more embodiments of the present disclosure, provided is a computer-readable storage medium, wherein a computer execution instruction is stored in the computer-readable storage medium, and when a processor executes the computer execution instruction, the interactive information display method in the first aspect and various possible designs of the first aspect is implemented.

In a fifth aspect, an embodiment of the present disclosure provides a computer program product, including a computer program, wherein the computer program, when executed by a processor, implements the interactive information display method in the first aspect and various possible designs of the first aspect.

What have been described above are only preferred embodiments of the present disclosure and illustrations of the technical principles employed. It will be appreciated by those skilled in the art that the disclosure scope involved in the preset disclosure is not limited to the technical solutions formed by specific combinations of the above technical features, and meanwhile should also include other technical solutions formed by any combinations of the above technical features or equivalent features thereof without departing from the concept of the disclosure, for example, technical solutions formed by mutual replacement of the above features with technical features having similar functions disclosed in the present disclosure (but is not limited to).

In addition, although various operations are depicted in a particular order, this should not be understood as requiring that these operations are performed in the particular order shown or in a sequential order. In certain circumstances, multitasking and parallel processing may be advantageous. Similarly, although several specific implementation details have been contained in the above discussion, these should not be construed as limiting the scope of the present disclosure. Certain features that are described in the context of separate embodiments may also be implemented in combination in a single embodiment. Conversely, various features that are described in the context of a single embodiment may also be implemented in a plurality of embodiments separately or in any suitable sub-combination.

Although the present theme has been described in language specific to structural features and/or methodological actions, it should be understood that the theme defined in the appended claims is not necessarily limited to the specific features or actions described above. Rather, the specific features and actions described above are merely example forms of implementing the claims.

Embodiments of the present disclosure provide an interactive information display method and apparatus, an electronic device and a storage medium. The method includes: displaying a first interactive interface corresponding to a target game room; obtaining target media, and playing the target media in the first interactive interface; when the target media is played to a target playing position, pausing the playing of the target media, and displaying first interaction information, wherein the first interaction information is used for indicating a target user in the target game room; and displaying second interaction information in the first interactive interface, wherein the second interaction information represents the consistency between voice content of first response voice input by the target user and target information, and the target information represents media content of the target media after the target playing position. During the process of playing the target media in the target game room, automatic pause is performed at the target playing position to display the first interaction information, so as to guide the speaking, and then the first response voice is evaluated. Therefore, automatic guidance and propulsion of the game flow are realized.

The invention claimed is:
1. An interactive information display method, comprising:
displaying a first interactive interface corresponding to a target game room;
obtaining target media, and playing the target media in the first interactive interface;
in response to the target media being played to a target playing position, pausing the playing of the target media, and displaying first interaction information, the first interaction information is used for indicating a target user in the target game room; and
displaying second interaction information in the first interactive interface, the second interaction information representing a consistency between voice content of a first response voice input by the target user and target information, and the target information representing media content of the target media after the target playing position,
wherein obtaining the target media comprises:
determining a target media form based on a first instruction, the target media form comprising at least one piece of media data of a target type; and
obtaining the target media from the target media form, and wherein obtaining the target media from the target media form comprises:
obtaining a number of participating users in the target game room;

obtaining alternative media data from the target media form according to the number of participating users;

in response to receiving a second instruction, updating a number of the alternative media data, the second instruction representing an exit action of the participating user for the target game room; and obtaining the target media by obtaining any piece of media data from the alternative media data randomly.

2. The method according to claim 1, wherein before obtaining the target media, the method further comprises:

determining the participating users in the target game room according to a joining request sent by at least one terminal device; and displaying, in the first interactive interface, user identifiers corresponding to the participating users.

3. The method according to claim 2, wherein displaying, in the first interactive interface, the user identifiers corresponding to the participating users comprises:

obtaining voice order of the participating users in the target game room; and arranging and displaying corresponding user identifiers in a first area of the first interactive interface sequentially according to the voice order; and the method further comprises:

in response to displaying the first interaction information, highlighting, in the first area, a user identifier corresponding to the target user.

4. The method according to claim 1, wherein before displaying the second interaction information in the first interactive interface, the method further comprises:

obtaining a first response voice input by the target user;

obtaining corresponding response information by performing feature extraction on the first response voice; and obtaining the second interaction information by comparing the response information with the target information.

5. The method according to claim 4, wherein the response information comprises response texts; the target information comprises target texts representing media content of the target media after the target playing position, and the second interaction information comprises a consistency score representing a percentage of consistency between content of the first response voice and the target information; and obtaining the second interaction information by comparing the response information with the target information comprises:

obtaining a text repetition rate of the response texts relative to the target texts by comparing the response texts with the target texts character by character; and obtaining the consistency score according to the text repetition rate.

6. The method according to claim 4, wherein the response information comprises a voice melody feature; the target information comprises a target melody feature representing the media content of the target media after the target playing position; and obtaining the second interaction information by comparing the response information with the target information comprises:

obtaining the second interaction information according to a similarity between the voice melody feature and the target melody feature.

7. The method according to claim 1, wherein before displaying the second interaction information in the first interactive interface, the method further comprises:

obtaining a first response voice input by the target user;

respectively sending the first response voice to terminal devices corresponding to the participating users in the target game room; and generating the second interaction information according to third interaction information sent by terminal devices corresponding to at least one participating user in the target game room, wherein the third interaction information represents a determination result of the corresponding participating user on the consistency between the voice content of the first response voice and the target information.

8. The method according to claim 1, wherein playing the target media in the first interactive interface comprises:

obtaining an starting playing position, the starting playing position being a position of a first playing duration in front of the target playing position of the target media; and playing the target media starting from the starting playing position.

9. The method according to claim 1, wherein the second interaction information comprises first judgment information or second judgment information, wherein the first judgment information represents that the voice content of the first response voice is consistent with the target information; the second determination information represents that the voice content of the first response voice is inconsistent with the target information; and in response to the second interaction information comprising the second judgment information, the method further comprises:

displaying a random component in a second interactive interface, the random component being used for determining one piece of target action information randomly from at least two pieces of preset action information, and the action information being used for representing a behavior action of the user.

10. The method according to claim 1, wherein the method further comprises:

obtaining a game round and a login state; and in response to the login state being a non-login state and the game round being a target round, displaying a third interactive interface, the third interactive interface being used for logging in or downloading an application program corresponding to the target game room.

11. An electronic device, comprising: a processor, and a memory in communication connection with the processor;

the memory stores computer execution instructions; and the processor executes the computer execution instructions stored in the memory to cause the processor to:

display a first interactive interface corresponding to a target game room;

obtain target media, and playing the target media in the first interactive interface;

in response to the target media being played to a target playing position, pause the playing of the target media, and display first interaction information, the first interaction information is used for indicating a target user in the target game room; and display second interaction information in the first interactive interface, the second interaction information representing a consistency between voice content of a first response voice input by the target user and target information, and the target information representing media content of the target media after the target playing position, wherein the instructions to obtain the target media comprise instructions causing the processor to:

determine a target media form based on a first instruction, the target media form comprising at least one piece of media data of a target type; and obtain the target media from the target media form, and wherein the instructions to obtain the target media from the target media form comprise instructions causing the processor to:

obtain a number of participating users in the target game room;

obtain alternative media data from the target media form according to the number of participating users;

in response to receiving a second instruction, update a number of the alternative media data, the second instruction representing an exit action of the participating user for the target game room; and obtain the target media by obtaining any piece of media data from the alternative media data randomly.

12. The device according to claim 11, wherein the memory further stores instructions causing the processor to:

determine the participating users in the target game room according to a joining request sent by at least one terminal device; and display, in the first interactive interface, user identifiers corresponding to the participating users.

13. The device according to claim 12, wherein the instructions to display, in the first interactive interface, the user identifiers corresponding to the participating users comprise instructions causing the processor to:

obtain voice order of the participating users in the target game room;

arrange and display corresponding user identifiers in a first area of the first interactive interface sequentially according to the voice order; and in response to displaying the first interaction information, highlight, in the first area, a user identifier corresponding to the target user.

14. The device according to claim 11, wherein the memory further stores instructions causing the processor to:

obtain a first response voice input by the target user;

obtain corresponding response information by performing feature extraction on the first response voice; and obtain the second interaction information by comparing the response information with the target information.

15. The device according to claim 14, wherein the response information comprises response texts; the target information comprises target texts representing media content of the target media after the target playing position, and the second interaction information comprises a consistency score representing a percentage of consistency between content of the first response voice and the target information; and the instructions to obtain the second interaction information by comparing the response information with target information comprise instructions causing the processor to:

obtain a text repetition rate of the response texts relative to the target texts by comparing the response texts with the target texts character by character; and obtain the consistency score according to the text repetition rate.

16. A non-transitory computer-readable storage medium storing computer execution instructions, the computer execution instruction, when executed by a processor, causing the processor to:

display a first interactive interface corresponding to a target game room;

obtain target media, and playing the target media in the first interactive interface;

in response to the target media being played to a target playing position, pause the playing of the target media, and display first interaction information, the first interaction information is used for indicating a target user in the target game room; and display second interaction information in the first interactive interface, the second interaction information representing a consistency between voice content of a first response voice input by the target user and target information, and the target information representing media content of the target media after the target playing position, wherein the instructions to obtain the target media comprise instructions causing the processor to:

determine a target media form based on a first instruction, the target media form comprising at least one piece of media data of a target type; and obtain the target media from the target media form, and wherein the instructions to obtain the target media from the target media form comprise instructions causing the processor to:

obtain a number of participating users in the target game room;

obtain alternative media data from the target media form according to the number of participating users;

in response to receiving a second instruction, update a number of the alternative media data, the second instruction representing an exit action of the participating user for the target game room; and obtain the target media by obtaining any piece of media data from the alternative media data randomly.

* * * * *